(12) United States Patent
Herbers

(10) Patent No.: US 9,803,824 B2
(45) Date of Patent: Oct. 31, 2017

(54) SUPPLEMENTARY LIGHT MODULE FOR A HEADLAMP OF A VEHICLE

(71) Applicant: Hella KGaA Hueck & Co., Lippstadt (DE)

(72) Inventor: Thomas Herbers, Lippstadt (DE)

(73) Assignee: Hella KGaA Hueck & Co., Lippstadt (DE)

( * ) Notice: Subject to any disclaimer, the term of this patent is extended or adjusted under 35 U.S.C. 154(b) by 46 days.

(21) Appl. No.: 14/647,524

(22) PCT Filed: Nov. 4, 2013

(86) PCT No.: PCT/EP2013/072893
§ 371 (c)(1),
(2) Date: May 27, 2015

(87) PCT Pub. No.: WO2014/082817
PCT Pub. Date: Jun. 5, 2014

(65) Prior Publication Data
US 2015/0308651 A1    Oct. 29, 2015

(30) Foreign Application Priority Data

Nov. 30, 2012  (DE) .................. 10 2012 111 639

(51) Int. Cl.
*F21S 8/10* (2006.01)
*B60Q 1/18* (2006.01)
(Continued)

(52) U.S. Cl.
CPC ............ *F21S 48/31* (2013.01); *B60Q 1/0683* (2013.01); *B60Q 1/072* (2013.01); *B60Q 1/143* (2013.01);
(Continued)

(58) Field of Classification Search
CPC ....... F21S 48/31; F21S 48/1305; F21S 48/328
See application file for complete search history.

(56) References Cited

U.S. PATENT DOCUMENTS 4,674,018 A * 6/1987 Ryder .................. B60Q 1/0683
362/424
5,390,098 A * 2/1995 Reiland ................ B60Q 1/0683
362/289
(Continued)

FOREIGN PATENT DOCUMENTS

DE    19843817 A1    4/2000
DE    19860461 A1    7/2000
(Continued)

*Primary Examiner* — Elmito Breval
(74) *Attorney, Agent, or Firm* — Husch Blackwell LLP

(57) ABSTRACT

A supplementary light module for a headlamp of a vehicle, and in particular a cornering light module, a turning light module, or a fog light module. Such module can be accommodated in a housing of the headlamp, comprising a lamp and a reflector. The light generated by the lamp can be emitted in a propagation direction. A base body is provided, on which at least the lamp and the reflector are accommodated, and wherein the base body is securely accommodated in the headlamp housing by means of a pivot axle and by means of an adjustment unit for adjusting the supplementary light module about the pivot axle.

10 Claims, 2 Drawing Sheets

(51) Int. Cl.
  *B60Q 1/068* (2006.01)
  *B60Q 1/14* (2006.01)
  *B60Q 1/072* (2006.01)

(52) U.S. Cl.
  CPC ............ *B60Q 1/18* (2013.01); *F21S 48/1159* (2013.01); *F21S 48/1305* (2013.01); *F21S 48/328* (2013.01); *B60Q 2300/146* (2013.01)

(56) References Cited

U.S. PATENT DOCUMENTS

| | | | | |
|---|---|---|---|---|
| 5,428,510 | A * | 6/1995 | Shirai | B60Q 1/007 362/289 |
| 5,429,011 | A * | 7/1995 | Stevenson | B60Q 1/0683 362/524 |
| 5,633,710 | A * | 5/1997 | Kumra | B60Q 1/10 315/82 |
| 2002/0018348 | A1 * | 2/2002 | Miki | B60Q 1/076 362/514 |
| 2005/0262954 | A1 * | 12/2005 | Eto | B60Q 1/076 74/89.36 |
| 2012/0195058 | A1 * | 8/2012 | Uchida | F21S 48/1154 362/520 |
| 2012/0201042 | A1 * | 8/2012 | Shibata | F21S 48/1721 362/538 |
| 2012/0257400 | A1 * | 10/2012 | Shibata | B60Q 1/076 362/460 |

FOREIGN PATENT DOCUMENTS

| | | | |
|---|---|---|---|
| DE | 10140277 A1 | 2/2003 | |
| DE | 102004060890 A1 | 6/2006 | |
| DE | 102006038915 A1 | 2/2008 | |
| DE | 202007018181 U1 | 6/2008 | |
| DE | 102008003706 A1 * | 7/2009 | ........... B60Q 1/0023 |
| DE | 102011081062 A1 | 2/2013 | |
| EP | 2517929 A2 | 10/2012 | |

* cited by examiner

SUPPLEMENTARY LIGHT MODULE FOR A HEADLAMP OF A VEHICLE

CROSS REFERENCE

This application claims priority to International Application No. PCT/EP2013/072893, filed on Nov. 4, 2013, which itself claims priority to German Application No. 10 2012 111639.3, filed Nov. 30, 2012, both of which are hereby incorporated by reference.

FIELD OF TECHNOLOGY

The present invention relates to a supplementary light module for a headlamp of a vehicle, and the supplementary light module can form, for example, a cornering light module, a turning light module, or a fog light module. The supplementary light module can be accommodated in the housing of the headlamp, and has a lamp and a reflector, by means of which light generated by the lamp can be emitted in a propagation direction.

BACKGROUND

Supplementary light modules can be accommodated in the housing of a headlamp in addition to main light modules for providing a low beam or a high beam, and are usually located in a spatially coordinate assembly to the main light module in the housing of the headlamp. Newer models of headlamps have non-active, static supplementary light modules incorporated in the headlamp, which are only activated and deactivated for a cornering light function, a turning light module and/or a fog light function. Light modules of this type can likewise have a light/dark border (LDB), like that of the main light module, in order to avoid blinding other traffic, for example. Accordingly, it may also be necessary to adjust the supplementary light module in a headlamp.

DE 101 40 277 A1 shows a supplementary light module for a vehicle headlamp, which is designed as a cornering light module and is accommodated in the housing of the headlamp. The cornering light module is designed as an integral part of a high beam module, and is located between a low beam module and the high beam module. It is disadvantageous that a separate adjustment of the cornering light module, in particular with regard to the propagation direction of the light emitted by a lamp of the cornering light module, is not possible.

DE 198 43 817 A1 shows a headlamp for a vehicle having various supplementary light modules, which are accommodated in the housing of the headlamp in addition to a main light module for providing a low beam light. A first supplementary light module is designed as a cornering light module, and a second supplementary light module is designed as a fog light module. The supplementary light modules are designed as projection light modules, and are angled in relation to the propagation direction of the light provided by the low beam light module. As a result of the stationary inclination of the cornering light module, it can be installed in a fixed manner in the housing of the headlamp, such that a displacement, in particular of the projection lens of the cornering light module, can be prevented. The cornering light of the headlamp facing the curve can be generated independently of the low beam thereby, and superimposed on the low beam while driving through the curve.

A further assembly for a supplementary light module in a headlamp for a vehicle is made known from DE 10 2006 038 915 A1, which can be pivoted about an axis by means of a beam range controller. The accommodation of the supplementary light module is shown only schematically thereby, and the beam range of the light emitted by the cornering light module can be varied by the pivoting thereof about the horizontal axis, in order to avoid blinding other traffic, for example.

Newer models of headlamps are preferably constructed using static light modules having semiconductor light sources, and a supplementary light function, such as a cornering light, a turning light and/or a fog light are activated as needed, in that the lamp allocated to the supplementary light module is switched on, without mechanically moving the light module in the headlamp. By way of example, a cornering light module can be rigidly accommodated in the headlamp housing, and an activated low beam light can be added thereto when, for example, the vehicle travels around a curve, or when a turning situation is present, such that a turning light function can be fulfilled by the cornering light module at the same time.

Despite the static installation situation of further light modules in headlamps of newer models, an adjustment of the supplementary light modules is necessary, at least for alignment purposes. Usually, supporting frames are provided for this, via which the supplementary light module can be moved, or can be accommodated such that it can be adjusted, respectively, in the headlamp housing. Significant heat arises, however, at the installation location of the light sources as a result of the increasingly used semiconductor light sources, which must be discharged via heat sinks, and it is normally provided that the lamps be accommodated over the heat sinks in the supporting frame. An effective heat discharge and a simple accommodation of the supplementary light modules is made more difficult thereby, however, because the heat sinks are large, and exert increased forces on the supporting frames when the headlamp is subjected to dynamic loads. In particular, it is difficult to adjust the supplementary light modules because they are installed in the headlamp such that they cannot be accessed, such that the alignment of the headlamp prior to its installation in a vehicle may be very complicated.

SUMMARY OF THE INVENTION

Based on the disadvantages of the prior art, the object of the invention is to create a supplementary light module for installation in the housing of a headlamp, having an adjustment possibility for the position and orientation of the supplementary light module in the housing, such that it is possible to mechanically load the supplementary light assembly in the housing of the headlamp, despite its being adjustable. There is the additional object of enabling an advantageous cooling of the lamp in the light module.

This object is achieved based on a supplementary light module in accordance with the preamble of claim 1 in conjunction with the characterizing features. Advantageous further developments of the invention are specified in the dependent claims.

The invention includes the technical teachings that a base body is provided, on which at least the lamp and the reflector are accommodated, and wherein the base body is accommodated in a secure manner by means of a pivot axle and by means of an adjustment unit for adjusting the supplementary light module about the pivot axle in the headlamp housing.

The invention is based on the idea, thereby, that the supplementary light module is designed having a base body, by means of which the supplementary light module can be disposed directly in the headlamp housing, without the necessity of a supporting frame. A direct connection of the base body to the headlamp housing can be generated thereby, in accordance with the invention, by means of the pivot axle and by means of the adjustment unit. The position and orientation of the base body in the headlamp housing can be altered by means of the adjustment unit, such that the propagation direction of the light generated by the lamp and emitted via the reflector can also be adjusted. If, for example, the headlamp is installed rigidly in the frame of the vehicle, then the propagation direction of the light can be adjusted, in particular in the vertical direction, in particular, it can be aligned. The adjustment can be carried out thereby, by means of a single engagement with the adjustment unit when adjusting the headlamp, which then remains unchanged during the operation of the headlamp in the vehicle. By using a pivot axle for connecting the base body to the headlamp housing, a robust accommodation of the base body in the headlamp housing, that can be subjected to loads, is obtained. Moreover, there is the advantage, obtained by means of the base body, that numerous components, forming the supplementary light module, can be accommodated on the base body. By way of example, the lamp and the reflector can be disposed directly on the base body, such that these components do not need to be readjusted in relation to one another.

In particular, the mounting of the lamp can occur directly on the parts needed for the light function, for the adjustment thereof, without using additional components, which define additional axes for mounting the light module in the housing, via which the propagation direction of the light from the supplementary light module must be adjusted with screws and other adjustment means. In particular, normative guidelines regarding the light/dark border can be pre-adjusted in a simple manner by means of the assembly according to the invention of the supplementary light module, via the base body, because a light provided by a supplementary light module also has a light/dark border that may not exceed a maximum vertical range.

The supplementary light module can preferably by designed without a projector lens, such that one or more lamps illuminate a reflector, through which the light is emitted directly in a propagation direction. The propagation direction characterizes the focal point of the light that is emitted thereby.

According to an advantageous embodiment, the base body can be an integral unit, wherein the pivot axle can run, at least in part, through the base body. In particular, the base body can be composed of a metallic substance, in particular aluminum, such that an effective cooling of at least the lamp can be obtained. A heat discharge of the lamp may already be sufficient through the comparatively large surface area of the base body, without needing to use an additional heat sink. The base body can be composed, in particular, of such a material, so that it can be produced in a metal pressure die casting method. The heat discharge from the lamp is further promoted thereby, by the single-piece design of the base body.

If the pivot axle runs at least in part through the base body, a particularly mechanically loadable, stable connection between the base body and the headlamp housing is obtained. The pivot axle can be formed by typical axle bolt thereby, or it may be the case that the pivot axle runs as a virtual axis through two connection points between the base body and the headlamp housing.

A further advantage is obtained in that the propagation direction of the light runs substantially in a horizontal plane, and an adjustment plane, in a likewise horizontal plane, is formed by the pivot axle and by a connecting point formed between the base body and the adjustment unit, such that the propagation direction of the light runs substantially parallel to and over the adjustment plane. In the installation situation of the headlamp, the adjustment plane runs basically in the horizontal plane, and the propagation direction of the light lies above the adjustment plane, this propagation direction being defined by the focal point of the light in the emitted light field. The pivot axle lies at the back side, facing away from the propagation direction of the light, and when the adjustment unit is activated, the adjustment plane is raised or lowered in the direction facing the propagation direction, by means of which a tilting of the base body about the pivot axle is generated. If, for example, the front side of the base body is lowered, then the light/dark border of the emitted light is lowered. If the front side of the base body is raised, then the light/dark border is raised vertically. A mechanically stable installation situation for the base body is obtained by the basically horizontal adjustment plane, which is prone to mechanical effects to only a sight degree, in particular mechanical oscillations. As a result, the light provided by the supplementary light module can also be reliably and precisely adjusted.

According to an advantageous embodiment, the adjustment unit has an adjustment screw, which extends, in particular, vertically through the headlamp housing and can be manipulated from outside the housing. The adjustment screw can be screwed into a threaded bore, for example, existing in the base body. An opening may be provided in the headlamp housing, through which the adjustment screw extends, such that the screw head of the adjustment screw, for example, lies outside of the headlamp housing.

To further advantage, the adjustment unit can comprise an elastic element, disposed, in particular, between the base body and the housing. The elastic element can be squeezed lightly thereby, and in particular, the adjustment screw can be fed through the elastic element. If the adjustment screw is screwed further into the threaded bore in the base body, the squeezing force exerted on the elastic element is increased, and at the same time, the connecting point between the adjustment unit and the base body is lowered. If the adjustment screw is screwed slightly out of the threaded bore in the base body, this occurs with an elastic resilience of the elastic element, by means of which, at the same time, the connecting point of the base body to the adjustment unit is again raised. If the adjustment screw preferably extends through the elastic element, the elastic element can seal the opening in the headlamp housing through which the adjustment screw is inserted, such that ingress of moisture and contaminants in the headlamp housing is prevented. Furthermore, shavings that may result from the screwing of the adjustment screw into the base body the can be caught by the elastic element.

As a result of the installation situation of the supplementary light module in the headlamp housing and the base body preferably being disposed on the floor surface of the housing, the adjustment screw can extend out of the housing at the bottom surface of the housing. This is then accessible to an operator, and in particular an installer, only when the headlamp is not yet installed in a vehicle. As a result, the alignment of the supplementary light module by means of the adjustment unit is employed only once, and a realignment or a calibration of the supplementary light module in the headlamp, in the framework of maintenance for example, is not provided for. The adjustment unit can, however, be reactivated at a later point in time, in order to modify the position and orientation of the base body in the headlamp housing.

To further advantage, a temperature measuring device may be provided, which is accommodated on the base body. The temperature of the base body can be measured with the temperature measuring device, by means of which it is possible to determine the temperature in the lamp. By way of example, when a threshold temperature has been reached, the power of the at least one lamp can be reduced, or switched off.

Another advantage is obtained in that the base body, in particular with the lamp, the reflector and/or the temperature measuring device, has a center of gravity, which is covered by the adjustment plane and lies, in particular, in the adjustment plane. The adjustment plane covers the center of gravity when the center of gravity lies within the adjustment plane, seen from a vertical perspective. On the other hand, the center of gravity then lies in the adjustment plane when the adjustment plane lies within the vertical plane, and the vertical spacing between the center of gravity and the adjustment plane is close to or equal to zero.

The present invention furthermore relates to a headlamp for a vehicle having a supplementary light module corresponding to that described above. The features and associated advantages described in conjunction with the supplementary light module described above are to be taken into consideration to the same extent for the headlamp according to the invention.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
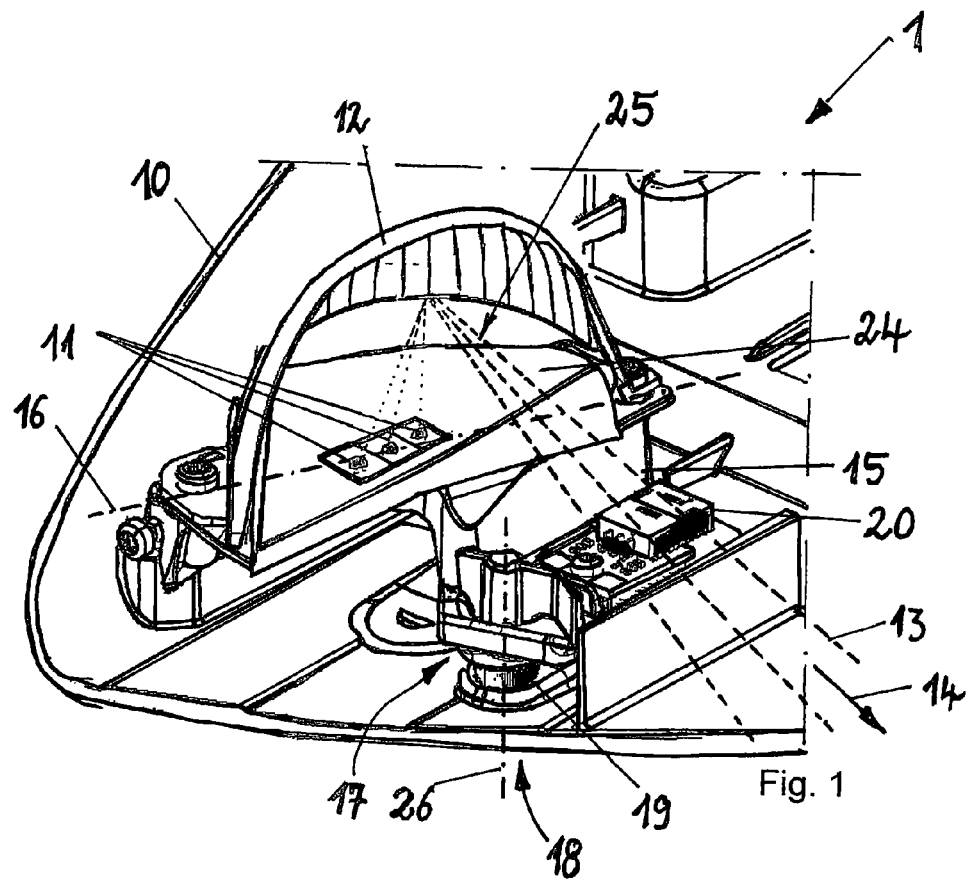
FIG. 1 shows a partial view of a headlamp having a supplementary light module in an installed situation in the housing of a headlamp.

FIG. 1 shows, in a perspective view, a section of a housing 10 of a headlamp in which a supplementary light module 1 is accommodated. The supplementary light module 1 is designed, by way of example, as a cornering light module, and has three lamps 11, which are indicated schematically. The lamps 11 are located behind, or beneath a cover plate 24, such that the light 13 provided by the lamps 11 passes by a shading edge 25 formed on the cover plate 24, and thus has a light/dark border. The propagation direction 14 of the light 13 is only shown schematically, and can run in any other direction corresponding to the opening direction of the reflector 12, which is a component of the supplementary light module 1.

According to the invention, the supplementary light module 1 has a base body 15, on which the lamps 11 and the reflector 12 are accommodated. The base body 15 is securely accommodated in the headlamp housing 10 via a pivot axle 16 and an adjustment unit 17 for adjusting the base body 15 about the pivot axle 16. The adjustment unit 17 enables an adjustment of the base body 15 in an adjustment axis 26, which is basically vertical, and in particular, is basically perpendicular to and spaced apart from the pivot axle 16. The pivot axle 16 connects the base body 15 to the headlamp housing 10 thereby, and extends in a transverse direction, to which the propagation direction 14 of the light 13 runs basically orthogonally. If the position and orientation of the base body 15 in the headlamp housing 10 changes along the vertical adjustment axis 26, then the base body 15 and the components mounted thereon tilt about the pivot axle 16, such that the propagation direction 14 of the light 13 is altered in the vertical direction. The light 13 obtains a light/dark border through the shading edge 25 of the cover panel 24, which can be altered in the vertical direction by adjusting the adjustment unit 17.

The adjustment unit 17 comprises an adjustment screw 18, which is disposed outside of the housing 10, on the underside thereof, and is thus not visible in FIG. 1. There is a threaded bore in the base body 15, into which the adjustment screw 18 is screwed, in order to change the position of the base body 15 in the vertical direction in the connecting point between the adjustment unit 17 and the base body 15. For this, an elastic element 19 is compressed in a resilient manner between the base body 15 and the inner surface of the housing 10, and if the adjustment screw 19 is then unscrewed slightly from the base body 15, then the elastic element 19 pushes the base body 15 upward, as a result of the resiliency, such that an adjustment mechanism for the base body 15, in both the upward as well as downward direction, is created, and such that the base body 15 tilts about the pivot axle 16.

Furthermore, a temperature measuring device 20 is depicted, which is disposed on the base body 15. The temperature measuring device 20 is used for determining the temperature of the base body 15, which may be made of aluminum and thus forms a heat conductor. If the lamps 11 reach a threshold temperature, this can be measured via the base body 15 by means of the temperature measuring device 20, whereupon the lamps 11 can be dimmed or switched off, in order to avoid overheating.

Figure 2:
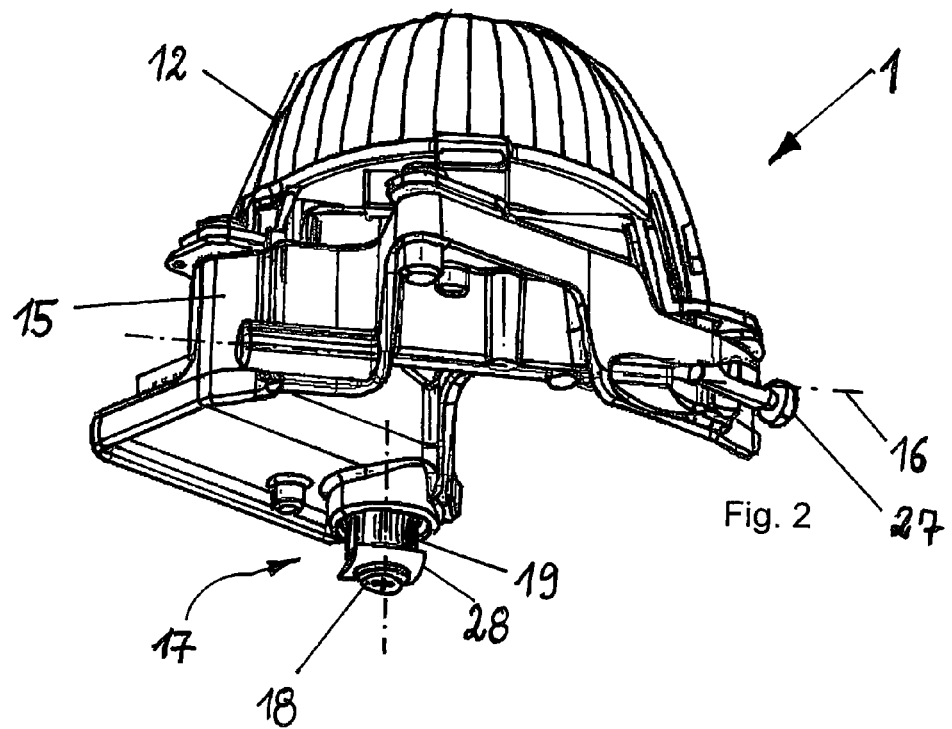
FIG. 2 shows a perspective view of the supplementary light module.

FIG. 2 shows a perspective view of the supplementary light module 1 having the base body 15 and the reflector 12 placed thereon. The perspective shows the course of the pivot axle 16, which can be designed as a pivot bolt (not visible), and is secured in the base body 15 with a securing screw element 27.

The adjustment device 17 having the adjustment screw 18 and the elastic element 19 is depicted in greater detail by the perspective. There is a compensating element 28 located beneath the screw head of the adjustment screw 18, having a semi-cylindrical shape, and which compensates for an angular displacement of the course of the adjustment screw 18 in the adjustment axis 26 in relation to the headlamp housing 10 when the base body 15 is tilted about the pivot axle 16, which also causes the slight tilting of the adjustment axis 26.

Figure 3:
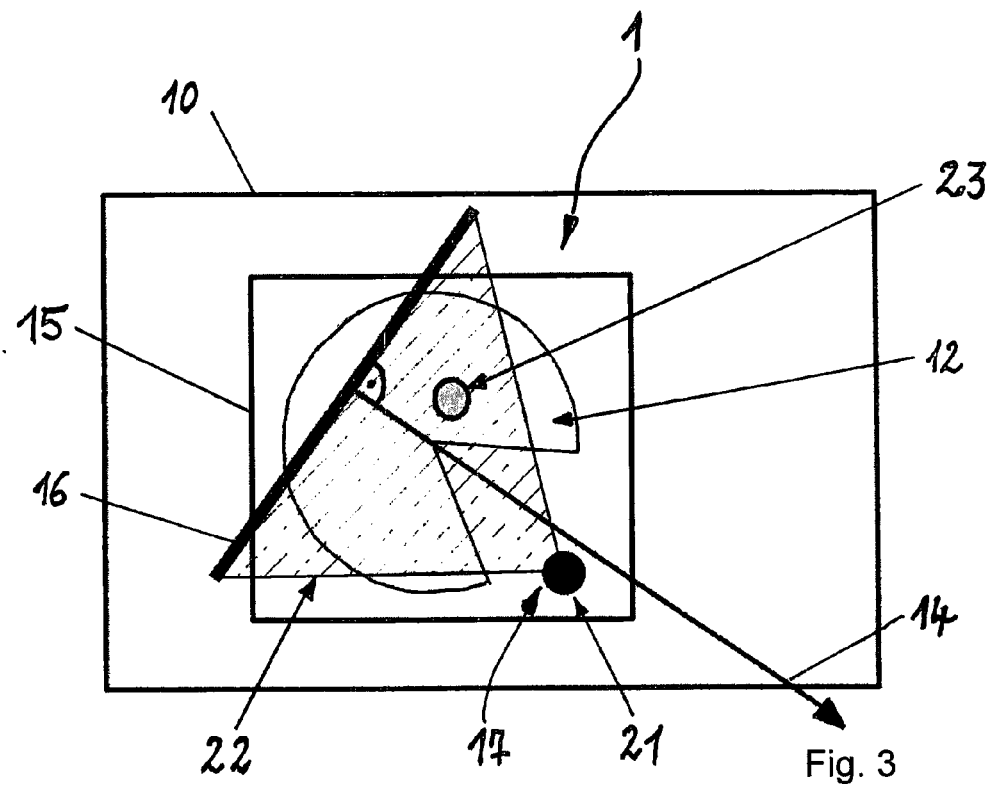
FIG. 3 shows a schematic view of a supplementary light module in a first embodiment.

FIG. 3 shows a schematic view of the supplementary light module 1 in a headlamp housing 10. The base body 15 is accommodated above the pivot axle 16 and can be adjusted in the connecting point 21 by means of the adjustment unit 17 lying thereunder. As a result, the base body 15 tilts about the pivot axle 16. An adjustment plane 22 is formed by the pivot axle 16 and the connecting point 21, and the propagation direction 14 of the light runs over the adjustment plane 22. In particular, the propagation direction 14 of the light exhibits a direction that forms an orthogonal to the pivot axle 16 of the supplementary light module 1, indicated by a right angle. Furthermore, a center of gravity 23 is indicated, which forms the center of gravity for the base body 15, the lamps 11 and the reflector 12, as well as, if applicable, the temperature measuring device 20. The center of gravity lies, advantageously, within the adjustment plane 22, having a triangular boundary formed by the pivot axle 16 and the connecting point 21 of the adjustment unit 17. If the adjustment unit 17 is activated and the connecting point 21 is adjusted in terms of height, then the base body 15 tilts about the pivot axle 16, by means of which the propagation direction 14 of the light 13 is adjusted in the vertical direction. The effect of the vertical adjustment of the propagation direction 14 is comparatively high thereby, because this runs somewhat over the connecting point 21.

Figure 4:
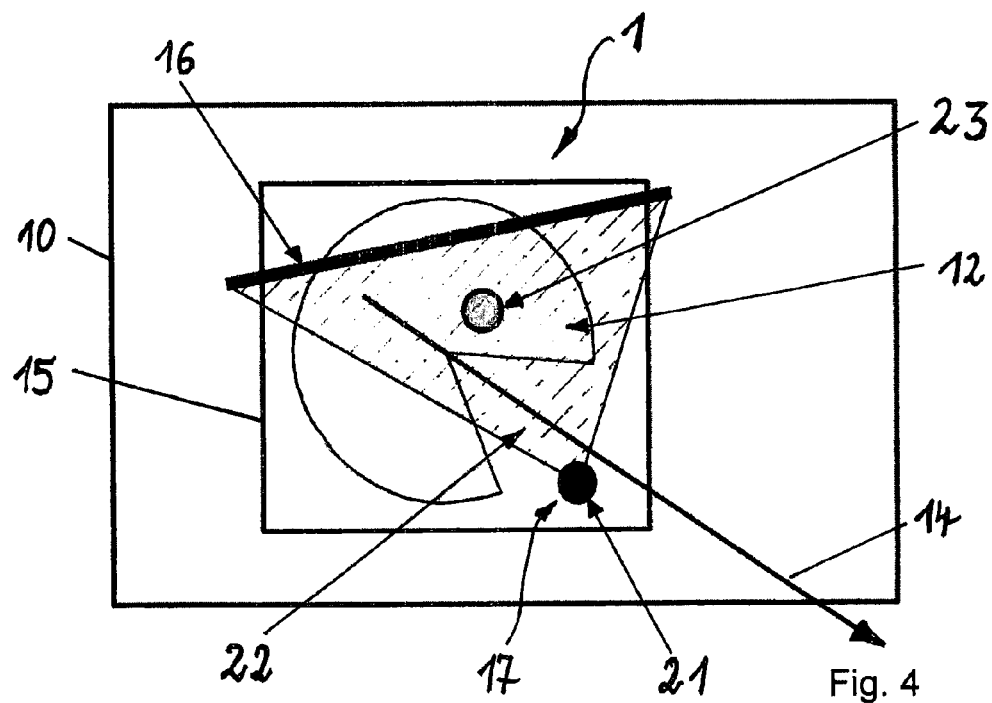
FIG. 4 shows another schematic view of a supplementary light module in a modified embodiment.

FIG. 4 shows a modified embodiment of the supplementary light module 1 having the base body 15, on which the reflector 12 is disposed, shown schematically. The base body 15 can be pivoted about the pivot axle, in that the adjustment unit 17 is activated and the connecting point 21 is altered in terms of its height. Also shown is the adjustment plane 22, which is located between the pivot axle 16 and the connecting point 21.

The propagation direction 14 of the light 13 does not run orthogonally to the direction of extension of the pivot axle 16 according to this exemplary embodiment, such that a change in height of the connecting point 21 generates, in addition to a vertical adjustment of the propagation direction 14, a tilting of the light 13 propagated in the propagation direction 14. The center of gravity of the assembly comprising the base body 15, the reflector 12 and the lamps 11 lies in the surface area center of the triangular adjustment plane 22.

The invention is not limited in its design to the preferred exemplary embodiment specified above. On the contrary, a number of variations are conceivable, which can also make use of the depicted solution in fundamentally different designs. All of the features and/or advantages that can be derived from the Claims, the description or the drawings, including structural details or spatial configurations, may be substantial to the invention, either in and of themselves, or in various combinations. The directions and orientations described as "horizontal," "vertical," "perpendicular," or "level" indicate only approximate directions with respect to the customary installation position and orientation of a headlamp in a vehicle.

LIST OF REFERENCE SYMBOLS 1 supplementary light module
10 housing
11 lamp
12 reflector
13 light
14 propagation direction
15 base body
16 pivot axle
17 adjustment unit
18 adjustment screw
19 elastic element
20 temperature measuring device
21 connecting point
22 adjustment plane
23 center of gravity
24 cover panel
25 shading edge
26 adjustment axis
27 securing screw element
28 compensating element

The invention claimed is:

1. A supplementary light module for a headlamp of a vehicle, said supplementary light module being at least one of a cornering light module, a turning light module, and a fog light module, said supplementary light module comprising:
a lamp;
a reflector by means of which light generated by the lamp can be emitted in a propagation direction;
a base body on which at least the lamp and the reflector are accommodated;
a pivot axle having a longitudinal axis aligned in a first direction, said pivot axle fixedly attaching the base body in the headlamp housing; and
an adjustment unit aligned in a second direction different than the first direction for attaching the base body in the headlamp housing and for adjusting the supplementary light module about the fixed longitudinal axis of the pivot axle in an adjustment axis; and
wherein the supplementary light module is accommodated in a housing of the headlamp.

2. The supplementary light module according to claim 1, wherein the base body is designed as an integral unit, and wherein the pivot axle runs at least in part through the base body.

3. The supplementary light module according to claim 1 wherein the base body is made of aluminum, and serves to cool at least the lamp.

4. The supplementary light module according to claim 1 wherein the propagation direction of the light runs substantially in a horizontal plane, and wherein the adjustment unit is designed to tilt the base body about the pivot axis.

5. The supplementary light module according to claim 1 wherein the adjustment unit comprises an adjustment screw, which extends vertically through the headlamp housing, and can be manipulated from the exterior of the housing.

6. The supplementary light module according to claim 1 wherein the adjustment unit comprises an elastic element, which is disposed between the base body and the housing.

7. The supplementary light module according to claim 1, wherein a temperature measuring device is provided on the base body.

8. The supplementary light module according to claim 1 wherein an adjustment plane is formed through the pivot axle and through a connecting point formed between the base body and the adjustment unit, wherein the propagation direction of the light runs substantially parallel to and over the adjustment plane.

9. The supplementary light module according to claim 8, wherein the base body has a center of gravity, which is covered by the adjustment plane, and lies in the adjustment plane.

10. A headlamp having a supplementary light module according to claim 1.

* * * * *